US009752882B2

(12) United States Patent
Salmikuukka et al.

(10) Patent No.: US 9,752,882 B2
(45) Date of Patent: Sep. 5, 2017

(54) TRANSPORTATION SYSTEM

(71) Applicants: Jukka Salmikuukka, Espoo (FI); Kenneth Kronkvist, Vantaa (FI); Pekka Korhonen, Espoo (FI); Harri Laensioe, Hyvinkaeae (FI); Ari Virtanen, Espoo (FI)

(72) Inventors: Jukka Salmikuukka, Espoo (FI); Kenneth Kronkvist, Vantaa (FI); Pekka Korhonen, Espoo (FI); Harri Laensioe, Hyvinkaeae (FI); Ari Virtanen, Espoo (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 14/953,886

(22) Filed: Nov. 30, 2015

(65) Prior Publication Data
US 2016/0084660 A1   Mar. 24, 2016

Related U.S. Application Data

(63) Continuation of application No. PCT/EP2013/061379, filed on Jun. 3, 2013.

(51) Int. Cl.
*G01C 21/20* (2006.01)
*B66B 31/00* (2006.01)
*B66B 3/00* (2006.01)

(52) U.S. Cl.
CPC ............. *G01C 21/206* (2013.01); *B66B 3/00* (2013.01); *B66B 31/00* (2013.01)

(58) Field of Classification Search
CPC .......... G01C 21/206; B66B 31/00; B66B 3/00
(Continued)

(56) References Cited

U.S. PATENT DOCUMENTS

| 2012/0072106 | A1 | 3/2012 | Han et al. |
| 2012/0158297 | A1* | 6/2012 | Kim ...................... G01C 21/206 701/516 |

(Continued)

OTHER PUBLICATIONS

International Search Report PCT/ISA/210 for International Application No. PCT/EP2013/061379 Dated Jul. 3, 2014.
(Continued)

*Primary Examiner* — Brian P Sweeney
(74) *Attorney, Agent, or Firm* — Harness, Dickey & Pierce, PLC

(57) ABSTRACT

The invention relates to a transportation system in an environment comprising several people conveyors as well as a navigation system installed on mobile devices held by the passengers of the transportation system, which transportation system comprises at least one wireless transmission device in connection with at least one of the passenger conveyors, wherein the navigation system comprises a calibration routine for generating a reference position of the mobile device in the environment, and the calibration routine can be initiated, if the distance of the mobile device to the wireless transmission device goes below a threshold value, in which calibration routine the wireless transmission device transfers position and/or identification data to the mobile device, whereupon the navigation system on the mobile device adopts the reference position of the related passenger conveyor.

20 Claims, 2 Drawing Sheets

Figure 1:
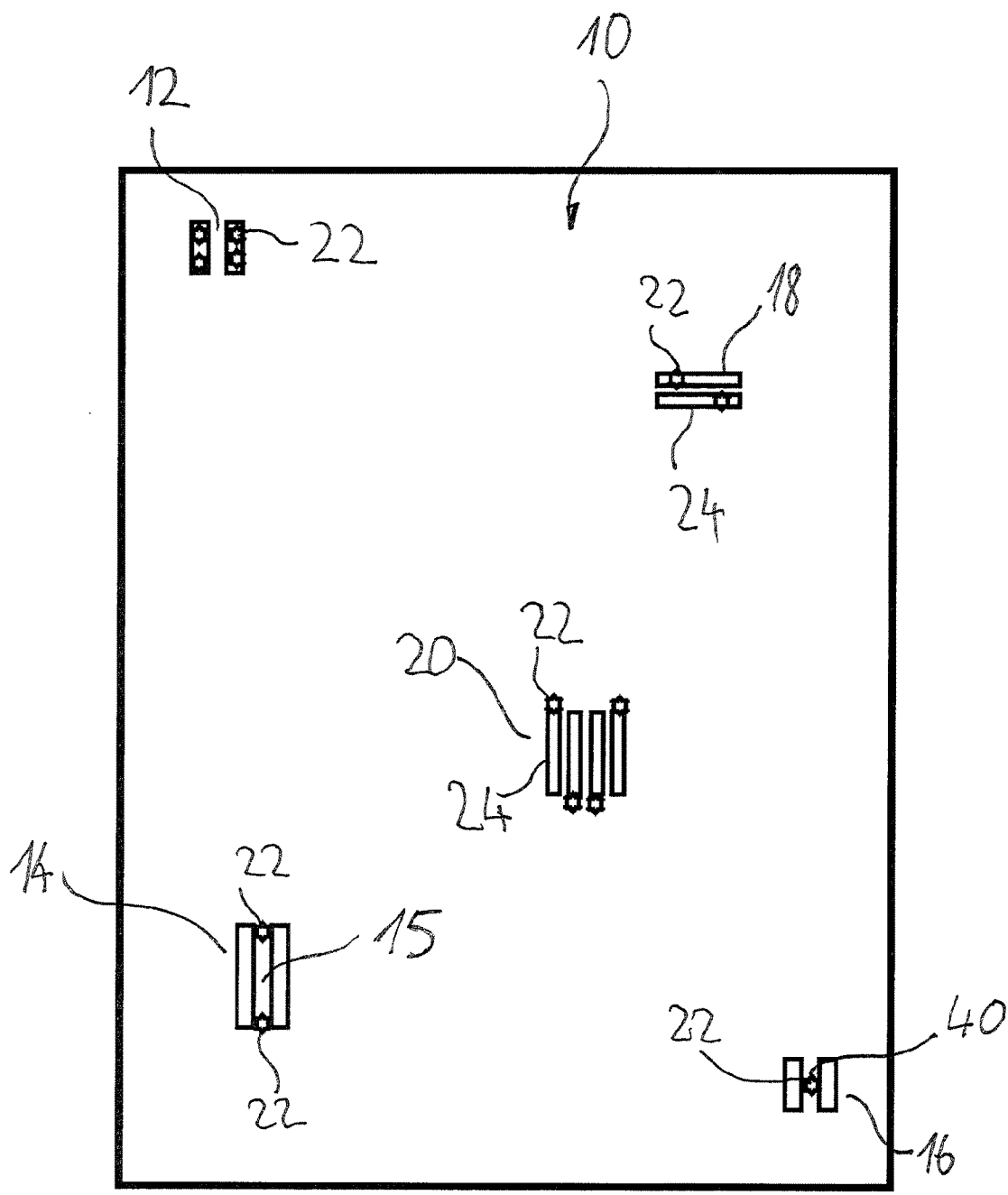

(58) Field of Classification Search
USPC .......................................................... 701/522
See application file for complete search history.

(56) References Cited

U.S. PATENT DOCUMENTS

2012/0253658 A1* 10/2012 Kappeler ................ B66B 1/468
                                                                                          701/410
2014/0253384 A1* 9/2014 Do .......................... G01S 19/12
                                                                                          342/386

OTHER PUBLICATIONS

Written Opinion of the International Searching Authority PCT/ISA/237 for International Application No. PCT/EP2013/061379 Dated Jul. 3, 2014.

* cited by examiner

TRANSPORTATION SYSTEM

This application is a continuation of PCT International Application No. PCT/EP2013/061379 which has an International filing date of Jun. 3, 2013, the entire contents of which are incorporated herein by reference.

The present invention relates to a transportation system in an environment comprising several people conveyors. Such an environment could be a building, a shopping mall or a railway station or an airport. The term "people conveyor" may comprise any technical conveyor which is adapted to transport people in horizontal and/or vertical direction as e.g. elevators, escalators, moving sidewalks or moving ramps.

Furthermore, the transportation system comprises a navigation system installed on mobile devices held by passengers of the transportation system. The navigation system is usually an indoor navigation algorithm or program installed on said mobile devices. The mobile devices which are preferably mobile phones or smartphones are able with the implemented navigation system to guide the passengers through the environment which is particularly important if the environment is a quite large building or a shopping mall or airport.

In these environments the obtaining of an indoor position of a person is in many cases done based on retrieving the position of a mobile device carried by a person, e.g. a mobile phone. The obtaining of the position (Positioning) can be done either in the mobile device itself or by a background system to which the mobile device is connected. The positioning of a person with indoor-navigation system requires that a starting point of the position in the environment can be set correctly. In brief, the exact position of a person is told to the navigation system, which then starts/continues indoor navigation based on this reference point information.

Generally, the inertial indoor-navigation, which is based on internal sensors in mobile phone like accelerometers, gyrostats, etc, can be carried out reliably within a time frame of about 60 to 120 seconds. The precondition is that the exact starting point is known. Besides knowing the position horizontally the challenge applies especially to the vertical position, to locate the person's floor. With existing indoor-navigation systems this reference point data capture requires several external devices to be installed into building (e.g. Bluetooth® hotspots or other sensors in different positions in each floor). This is very costly from HW and installation point of view and when such device gets broken it may be difficult to locate them afterwards to make the corrective action, which again generates additional life-cycle costs. Partly due these reasons the commercial success of indoor positioning systems has been very limited, in practice limited only to some very special cases which are not that cost-sensitive.

It is therefore object of the invention to provide a transportation system in an environment equipped with indoor navigation, which is able to reliably guide a passenger through the environment without much effort.

The system of the invention is characterized by the features of claim 1. Preferred embodiments of the invention are subject-matter of the dependent claims. Some inventive embodiments are also presented in the description section and in the drawings of the present application. The inventive content may also consist of several separate inventions, especially if the invention is considered in the light of expressions or implicit sub-tasks or from the point of a view of advantages or categories of advantages achieved. In this case, some of the attributes contained in the claims below may be superfluous from the point of view of separate inventive concepts. The features of the various embodiments can be applied within the scope of the basic inventive concept in conjunction with other embodiments.

On this behalf, the transportation system comprises at least one wireless transmission device which is provided in connection with at least one of the passenger conveyors. The wireless transmission device is preferably a short range transmission device, preferably based on WLAN, Wi-Fi® or Bluetooth® standards, preferably a "Hotspot" whereby the wireless transmission device is able to communicate with the mobile devices in the environment. The navigation system comprises a calibration routine for generating a reference position of the mobile device in the environment to inform the navigation system of the position of the mobile device in the environment. The calibration routine can be initiated if the distance of the mobile device to the wireless transmission device goes below a threshold value. This means when a passenger with his mobile device comes into the short range broadcast range of the wireless transmission device, the implemented navigation system, particularly a navigation algorithm gets information about the location of the passenger in the environment. The initiation can be provided by prompting the user of the system to start the calibration routine or the routine can be started automatically if the mobile device gets into the range of the wireless transmission device. Hereby the wireless transmission device transmits position data or simply its identification data to the mobile device which enables the navigation system to retrieve the corresponding position data. In this connection, it is also clear that the range of the wireless transmission device should be sufficiently small to keep the position data sufficiently correct. Therefore the broadcast range of the wireless transmission device should be less than a few meters, preferably smaller than three or two meters. The navigation system is preferably a navigation system which obtains the actual position data via internal sensors as e.g. accelerometers or gyrostats. These internal sensors usually enable the navigation system of the mobile device to retrieve the actual position data over a certain time period, e.g. 60-120 seconds.

By providing reference points in connection with the people conveyors, the hardware effort for providing reference data for the navigation system can be held low and the corresponding transmission device can be replaced with low effort, compared to any placement in connection with the building structures or generally with structures of the environment.

This invention therefore uses the transport system's, e.g. elevators positioning data to generate reference point data required by the indoor navigation system.

The environment shall e.g. be considered as a building with elevators and some indoor-positioning system in it. In this environment the elevator is aware of its exact location every second. When person is entering to elevator, this positioning data is automatically transferred from elevator system via the calibration routine into the navigation system of the mobile device carried by a person.

This can be done for example by the wireless transmission device sending continuously signals containing real-time position data within its short range of e.g. 2 m e.g. into the elevator car via for example using Bluetooth® or any other broadcasting standard adapted for short range transmission. This way each person carrying the mobile device will be allocated an exact reference position together with the corresponding floor. When the person leaves the elevator, the navigation system (for example the inertial positioning done in person's mobile device) knows the exact starting point. Now, for 60 to 120 seconds the internal sensor (inertial sensor as e.g. accelerometer or gyrostat) of the mobile device used by the navigation system can perform indoor navigation, which is long enough for the person to reach its destination at that floor. Alternatively there may be next hot spots within "the 60 to 120 second range" from the elevator to recalibrate the navigation system with a new reference position.

Reference position data could be also provided directly from the transportation system to the navigation system back end if the transportation system is capable of identifying an individual persons getting in (e.g. via user ID from access control system or by other means). When this is done with standardized interface, reference position data can be offered to any indoor navigation system. By doing so elevators form an essential element of an environment's position- or navigation infrastructure. This increases the customer value received from transportation system.

The invention provides at least one of the following benefits:
No need to install extra HW to the site,
Hardware cost saving
Time saving in positioning system installation
Cost saving because less hassle with faults and locating faulty external hotspots.

Standardized reference data interface to any positioning technology/system will make an elevator system to be essential part of indoor positioning systems, this will increase the customer value received from the elevator.

Generally, the terms "person" and "passenger" are used as synonyms. Further, the terms "navigation system" and "navigation algorithm" are used as system components with the same functionality. Normally navigation systems are implemented on a mobile device as a program or algorithm, which interacts with the internal sensors and communication devices of the mobile device. Further the terms "reference point" as well as "reference position" are used as synonyms. Further the terms "destination call panel" and "destination operating panel" are terms describing the same functional elements in the invention. The term "mobile device" designates all mobile devices as mobile phones, pocket communicators etc. which are able to communicate with the wireless transmission devices as well with internals sensors and which are further configured to carry out a navigation algorithm which outputs navigation data via an output interface as e.g. a display and/or a loudspeaker or earplugs.

Preferably the wireless transmission device can be located in connection with a ID card reader of an identification system of the transportation system. In this system the passenger has an ID card (RFID, NFC etc access tag/card). When ID card reader reads the tag/card, the passenger's position can be identified because position of the ID card reader is fixed. The ID card readers may be located in access gates, turnstiles, doors, DOPs (destination operating panels) of the transportation system. Further, the wireless transmission device is preferably located in an elevator or at the exit end of the escalator, moving sidewalk or moving ramp.

It is of course also possible to locate the wireless transmission device in connection with an elevator entrance, e.g. in the door jambs surrounding a landing door or car door of an elevator.

In case the wireless transmission device is located in connection with an elevator car, it preferably also communicates the floor as a part of the position data to the navigation system of the mobile device.

Preferably, the mobile device enables the algorithm of the navigation system to communicate with the internal sensors of the mobile device to retrieve position data from an internal sensor of the mobile device, as e.g. an accelerometers or gyrostat. The navigation algorithm is furthermore able to communicate with broadcasting hard- and software of the mobile device to enable the navigation system to communicate with the wireless transmission device and to obtain position or identification data therefrom.

Generally, it is sufficient that in the vicinity of the wireless transmission device, i.e. within a distance below the threshold value, the calibration routine of the navigation system can be started. The passenger could for example be prompted to start the calibration routine when the mobile device gets into the broadcast range of the wireless transmission device. Anyway, it is preferable that the calibration routine is automatically started when the mobile device gets into the broadcast range of the wireless transmission device, without that any interaction of the passenger is necessary. Via this measure it is ensured that the precision of the navigation system in the environment is maintained without any interaction of the passengers.

Preferably, the wireless transmission device is a transmission device working with the WLAN, Wi-Fi® or Bluetooth® standard and with a broadcast range as small as possible. The broadcast range can i.a. be delimited by the arrangement of the wireless transmission device as well as with the transmission power thereof.

As within the broadcast range the navigation system obtains one position point as reference position, it is clear that the larger the broadcast range is, the more inaccurate the position data becomes which is transmitted to the navigation system of the mobile device. On this behalf, it is preferable that the contact between the wireless transmission device and the mobile device is only made at a quite specific position of the passenger with regard to the people conveyor. This could be for example the exit end of the people conveyor or the access door of an elevator car. Preferably, the broadcast range should be smaller than 5 m, preferably smaller than 3 m or even 2 m so that the horizontal area where a connection of the wireless transmission device with a mobile device can be made has a diameter of less than 1.5 m, preferably less than 1 m.

Preferably, the wireless transmission device is integrated in a structure of an elevator cabin, preferably in the area of the car panel, as in this case the wireless transmission device can easily be maintained and replaced.

It is furthermore possible to locate the wireless transmission device in a destination operation panel (DOP) of an elevator where a passenger has to give in his destination floor for an elevator group. In this case, the wireless transmission device could also be connected with the controller of the elevator system as to inform the navigation system of the destination floor. It is in this case even possible to communicate the assumed date of arrival at the destination floor to the navigation system.

In case the wireless transmission device is located in an escalator, in a moving sidewalk or in a moving ramp, it is preferably integrated in a balustrade thereof. As the distance of a balustrade from the point where passengers normally held a mobile device is quite small, a wireless transmission device with a very small broadcast range of e.g. 1.5 m can be used which increases the accurateness of the reference point.

With the invention, the installation of the wireless transmission devices in the environment is easy and does not require any modifications at the environment itself. Furthermore, the range of the wireless transmission device can be chosen in connection with the location of the wireless transmission device in connection with the passenger conveyor such that the connection of the wireless transmission device with the mobile device is possible only in a very restricted area so that the accuracy of the reference point is further improved.

In connection with the internal sensor of the mobile device, it is therefore possible to place the wireless transmission devices in the environment that way that each passenger is able to reach his destination based on the activity of the internal sensors of the mobile device in connection with the implemented navigation system.

It is further possible to display on the mobile device the location of one or several adjacent wireless transmission device(s) as to enable the passenger to purposely recalibrate the navigation system of his mobile device during his travel through the environment.

Preferably, the wireless transmission devices are embodied as hot spots which connect to the mobile devices without any activity of the user of the transportation system.

Inertial indoor navigation systems based on internal sensors of mobile zones like accelerometers or gyrostats are per se known. As these systems allow indoor navigation in a certain time range of 60-120 seconds, these navigation systems in connection with the wireless transmission devices of the present invention allow reliable and exact indoor navigation with low hardware installation costs in the environment.

Preferably, the contact between the wireless transmission device and the mobile device can be provided by different routines. For example, it is possible that the wireless transmission device continuously or periodically (e.g. in short intervals of e.g. 1 second) sends position data which will automatically received by mobile devices passing by.

Another possibility is that the wireless transmission device only sends a prompting signal when a mobile device enters the transmission range. In this case the prompting signal is answered by the mobile device whereupon the wireless transmission device sends the position data or its identification data.

By sending the position data, the navigation system implemented in the mobile device directly receives the position of the wireless transmission device and therewith the position of the passenger within its transmission range. Alternatively, it is possible to transmit the identification data of the wireless transmission device in which case the navigation system has to have access to a table of the IDs of the wireless transmission devices in the environment with the corresponding positions. In this case, the navigation system is able to retrieve from the identification data the corresponding position data of the wireless transmission device. Via the invention, reference point data for the navigation system is provided via the transportation system to the navigation system. When the wireless transmission data is provided in connection with any control of the transportation system, it is also possible to communicate identification data of the passenger to the navigation system which might enable the navigation system to automatically indicate a certain route in the environment especially designed for said passenger or user of the transportation system. As for the wireless transmission device, standard transmission protocols are used as e.g. WLAN, Wi-Fi®, Bluetooth® hot spots. Accordingly, the transmitted reference point data can be offered to any indoor positioning system or technology, where is irrespective if it is based on accelerometers, gyrostats or any other internal sensors of the mobile device.

Hereby, the transportation system as e.g. elevators, escalators, moving side ramps and so on would form an essential element of the environment's positioning infrastructure. This increases the customer value received from the transportation system.

The invention is now described schematically with the aid of the appended drawings.

In these drawings

Figure 2:
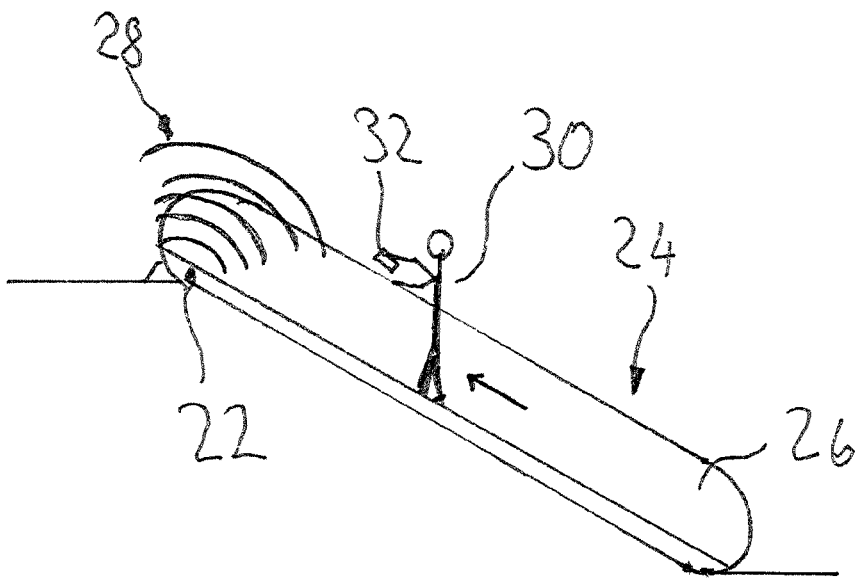
Figure 3:
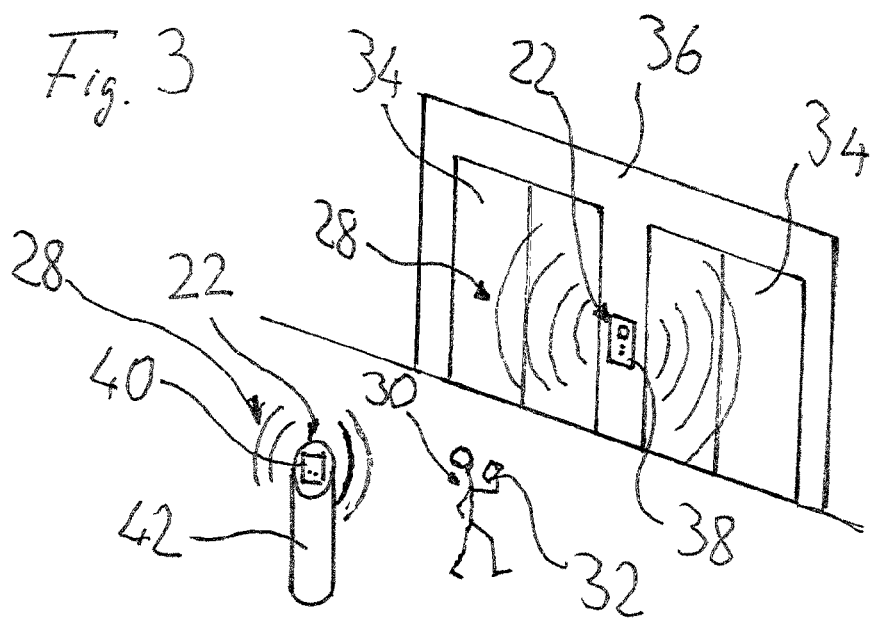

FIG. 1 shows a ground map of an environment with a transportation system having elevators and escalators, FIG. 2 shows an escalator with a wireless transmission device at its exit end, and FIG. 3 shows two possibilities to arrange a wireless transmission device in connection with an elevator group.

FIG. 1 shows a shopping mall 10 as an environment in the sense of the present invention. The shopping mall 10 has a transportation system with three elevator groups 12, 14, 16 and two escalator groups 18, 20. The shopping mall 10 offers an in-house navigation system which can be installed as an application on a mobile phone 32 (see FIGS. 2 and 3). For the indoor navigation, this navigation system makes use of the internal sensor (acceleration sensor or gyrostat) of the mobile phone. For the transmission of reference points for the navigation system, the transportation system 12, 14, 16, 18, 20 of the shopping mall 10 comprises Bluetooth® hot spots 22 which are indicated as stars in the drawing.

For example, in the first elevator group 12 comprising four elevator cars, a Bluetooth® hot spot 22 is provided in each of the elevator cars. In the second elevator group 14 comprising eight elevators, a Bluetooth® hot spot 22 is provided at both entrance/exit ends of the lobby 15 of the second elevator group 15. Accordingly, each person entering or leaving the lobby of the second elevator group 14 from either of the exit/entrance ends has to pass one of the Bluetooth® hot spots 22.

The third elevator group 16 is a four elevator group with destination control. A destination operating panel (DOP) 40 (see FIG. 3) is located in the middle of the elevator lobby and in connection with the destination operating panel a Bluetooth® hot spot 22 is provided. Together with each passenger inputting his destination at the DOP the internal navigation system of his mobile device will automatically get the new reference position of the correlated hot spot 22.

The transportation system of the shopping mall 10 further comprises a first escalator group 20 of four escalators 24 whereby each escalator 24 of the first escalator group 20 comprises a Bluetooth® hot spot 22 at its exit end.

Furthermore, the shopping mall 10 comprises a second escalator group 18 comprising two escalators 24 having each one Bluetooth® hot spot 22 in the vicinity of their exit ends.

As is may be seen from layout of the shopping mall 10, the hot spots 22 are scattered over the ground area of the shopping mall 10 so that each person should be able to reach his destination within the shopping mall 10 based on the internal sensor of the mobile device 32.

FIG. 2 shows an escalator 24 having balustrades 26 on each side of a conveyor path of escalator steps. At the exit end of the escalator 24, a Bluetooth® hot spot 22 is provided in one balustrade 26. The transmission range 28 of the Bluetooth® hot spot 22 is indicated with circle sectors. As it may be seen from the figure, the transmission range 28 is comparably short. The person 30 travelling on the escalator 24 rgets with his mobile device 32 into the transmission range 28 of the Bluetooth® hot spot 22 at the exit end of the escalator 22. In this case, a calibration routine of the navigation system on the mobile device 32 is automatically activated which adopts the position data communicated by the Bluetooth® hot spot 22 as the new position of the passenger 30 in the environment 10.

FIG. 3 shows another example of possible locations of a Bluetooth® hot spot 22 in connection with an elevator group 12, 14, 16 e.g. those of FIG. 1. FIG. 3 shows the landing doors 34 of two elevators located side by side. The landing doors 34 of both elevators are surrounded by a common door jamb 36 comprising a landing call panel 38. In connection with the landing door panel 38, a Bluetooth® hot spot 22 is arranged which has a transmission range 28 covering both landing doors 34. The arrangement could also be provided with two different Bluetooth® hot spots 22 each being directed to only one of these landing doors 34 so that for each landing door 34 a separate Bluetooth® hot spot is provided. When a person 30 enters an elevator behind a landing door 34 with this mobile device 32, the mobile device automatically comes into the transmission range 28 of the Bluetooth® hot spot 22 and the calibration routine of the navigation program is started to automatically adopt the position communicated via the Bluetooth® hot spot 22 as the position of the person 30 in the environment 10.

If a destination call system is used, a destination operating panel DOP 40 is arranged on a stand 42 in the centre of the elevator lobby. Each passenger intending to travel with this elevator group inputs his destination floor in the destination operating panel 40. In this case, the mobile device 32 automatically comes into the transmission range 28 of the Bluetooth® hot spot 22 arranged in connection with a destination operating panel 40 and thus the navigation system implemented thereon retrieves the correlated position data which is input via the calibration routine into the navigation program as actual position of the person.

It shall be clear for the skilled person that the above embodiments may be combined with each other arbitrarily. Furthermore, instead of Bluetooth® hot spots, Wi-Fi® or WLAN transmission devices or hot spots may be used. The wireless transmission devices 22 do not have be located at the exit ends but may also be located at the entrance ends or somewhere in the path of the escalators/travelators. As anyway the duration or the route of a mobile device with a navigation system based on an internal sensor is limited, it is preferable that the wireless transmission device is located at the exit ends of travelators or escalators or moving ramps. The invention may be varied within the scope of the appended patent claims.

Bluetooth® is a registered trademark of Bluetooth SIG, Inc.

Wi-Fi® is a registered trademark of Wi-Fi Alliance, Austin

The invention claimed is:

1. A transportation system in an environment, the transportation system comprising:
a plurality of people conveyors;
at least one wireless transmission device located in connection with at least one people conveyer of the plurality of people conveyors, the at least one wireless transmission device configured to transmit position and/or identification data; and
a mobile devices held by at least one passengers of the at least one people conveyer of the plurality of people conveyers, the mobile device configured to
receive the position and/or identification data, at the mobile device, from the wireless transmission device,
determine a reference position of the at least one people conveyer based on the position and/or identification data, and
adopt the determined reference position of the at least one people conveyer as a reference position of the mobile device in the environment, based on a determination that a distance between the mobile device and the wireless transmission device is less than a threshold value.

2. Transportation system according to claim 1, wherein the at least one people conveyor is an elevator.

3. Transportation system according to claim 2, wherein the wireless transmission device is located at an elevator entrance or in an elevator car of the elevator.

4. Transportation system according to claim 3, wherein the wireless transmission device is configured to transmits information indicating a floor at which the elevator car is located as part of the position and/or identification data.

5. Transportation system according to claim 1, wherein the at least one people conveyor is one of,
an escalator,
a moving sidewalk, or
a moving ramp.

6. Transportation system according to claim 1, wherein the wireless transmission device is a WLAN- or Bluetooth®.

7. Transportation system according to claim 1, wherein the wireless transmission device is located at an end of an escalator or moving sidewalk or ramp.

8. Transportation system according to claim 1, wherein the navigation system is configured to communicates with an internal sensor of the mobile device.

9. Transportation system according to claim 8, wherein the internal sensor is an accelerometer or a gyrostat.

10. Transportation system according to claim 1, wherein the wireless transmission device is a short-range transmission device.

11. Transportation system according to claim 1, wherein the wireless transmission device is integrated in a structure of an elevator car or in a door jamb of a landing or car door of an elevator.

12. Transportation system according to claim 1, wherein the wireless transmission device is integrated in a structure of an escalator or moving sidewalk or ramp.

13. Transportation system according to claim 1, wherein the mobile device is a mobile phone.

14. Transportation system according to claim 1, wherein the wireless transmission device is located in an operating panel of an elevator.

15. A method, comprising:
receiving position and/or identification data, at a mobile device, from a wireless transmission device, the wireless transmission device located in connection with a people conveyer;
determining, at the mobile device, a reference position of the people conveyer in an environment based on the position and/or identification data, and
adopting the determined reference position of the people conveyer as a reference position of the mobile device in the environment, based on a determination that a distance between the mobile device and the wireless transmission device is less than a threshold value.

16. The method according to claim 15, wherein the people conveyor is an elevator.

17. The method according to claim 16, wherein the wireless transmission device is located at an elevator entrance or in an elevator car of the elevator.

18. The method according to claim 17, wherein the position and/or identification data includes information indicating a floor at which the elevator car is located.

19. The method according to claim 15, wherein the people conveyor is one of,
an escalator,
a moving sidewalk, or
a moving ramp.

20. The method according to claim 15, wherein the wireless transmission device is located at an end of an escalator or moving sidewalk or ramp.

* * * * *